(12) United States Patent
Yeh

(10) Patent No.: US 10,831,322 B2
(45) Date of Patent: Nov. 10, 2020

(54) TOUCH CONTROL HUMAN-MACHINE INTERFACE DEVICE AND OPERATION METHOD THEREOF

(71) Applicant: eGalax_eMPIA Technology Inc., Taipei (TW)

(72) Inventor: Shang-Tai Yeh, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 0 days.

(21) Appl. No.: 15/975,040

(22) Filed: May 9, 2018

(65) Prior Publication Data

US 2018/0348908 A1    Dec. 6, 2018

Related U.S. Application Data

(60) Provisional application No. 62/512,797, filed on May 31, 2017.

(51) Int. Cl.

| G06F 3/044 | (2006.01) |
|---|---|
| G06F 21/00 | (2013.01) |
| G06K 19/00 | (2006.01) |
| G07C 9/00 | (2020.01) |
| G06F 3/0488 | (2013.01) |
| G06F 3/039 | (2013.01) |

(52) U.S. Cl.
CPC .......... G06F 3/044 (2013.01); G06F 3/0393 (2019.05); G06F 3/0488 (2013.01); G06F 21/00 (2013.01); G06K 19/00 (2013.01); G07C 9/00174 (2013.01); G06F 2203/04104 (2013.01)

(58) Field of Classification Search
None
See application file for complete search history.

(56) References Cited

U.S. PATENT DOCUMENTS

| 2012/0007817 A1* | 1/2012 | Heatherly | G06F 3/0416 |
| | | | 345/173 |
| 2013/0194202 A1* | 8/2013 | Moberg | G06F 3/044 |
| | | | 345/173 |
| 2014/0043264 A1* | 2/2014 | Kelley | G06F 3/041 |
| | | | 345/173 |
| 2014/0304806 A1* | 10/2014 | Koo | G06K 7/081 |
| | | | 726/16 |
| 2017/0116397 A1* | 4/2017 | Provkin | G06F 21/34 |

* cited by examiner

*Primary Examiner* — Dorothy Harris
(74) *Attorney, Agent, or Firm* — Muncy, Geissler, Olds & Lowe, P.C.

(57) ABSTRACT

A touch control human-machine interface device and an operation method thereof are disclosed. In the touch control human-machine interface device. The touch recognition device includes an insulative carrier, an upper electrode disposed on an upper surface of the insulative carrier, lower electrodes disposed on a lower surface of the insulative carrier, and conductive lines electrically connecting the upper electrode to the lower electrodes. When the user presses the upper electrode, the touch recognition device is pressed down to move the lower electrodes to contact an upper surface of a capacitive touch panel, a control unit can detect the capacitive touch panel to determine positions of the lower electrodes to define a XY coordinate system, so as to determine a coordinate of other lower electrode at the XY coordinate system. As a result, an identity of the user operating the touch recognition device can be defined by the determined coordinate.

14 Claims, 14 Drawing Sheets

501 — The user presses the upper electrode and the reciprocating electrode by the hand, to press down the touch recognition device to move the lower electrodes and the reciprocating electrode to contact the upper surface of the capacitive touch panel

502 — the control unit detects the change in amount of capacitive coupling formed between the capacitive touch panel, and the lower electrodes and the reciprocating electrode, so as to recognize the positions of the lower electrodes and the reciprocating electrode and then define a XY coordinate system according to positions of the three lower electrodes

503 — The coordinate of the reciprocating electrode at the XY coordinate system is determined, and the determined coordinate is used to define the identity of the user operating the touch recognition device

FIG. 11

TOUCH CONTROL HUMAN-MACHINE INTERFACE DEVICE AND OPERATION METHOD THEREOF

CROSS REFERENCE TO RELATED APPLICATIONS

This application claims the priority of U.S. Provisional Application No. 62/512,797, filed on May 31, 2017 under 35 U.S.C. § 119(e), the entire contents of all of which are hereby incorporated by reference.

BACKGROUND OF THE INVENTION

1. Field of the Invention

The present invention relates to a touch control human-machine interface device and an operation method thereof. More particularly, in the touch control man-machine interface device, a user can press down an upper electrode of a touch recognition device, to move lower electrodes of the touch recognition device to contact a capacitive touch panel, and positions of the three lower electrodes can be detected and used to define a XY coordinate system, and a coordinate of another lower electrode is determined in the XY coordinate system and used to define an identity of the user using the touch recognition device.

2. Description of the Related Art

A touch-sensitive electronic system, such as touch panel or touch screen, is one of the most important human-machine interfaces, and is widely applied in many electronic devices such as smartphone, notebook, and tablet. Particularly, these electronic devices become indispensable for modern people, and a large number of touch panels are used in these electronic devices as the main man-machine interface. At present, existing touch-sensing systems can be classified into resistive type, capacitive type, optical type, and surface acoustic wave type. The capacitive touch control technology is mostly used in small-sized or medium-sized touch screen, and becomes the mainstream technology on the market.

An existing touch screen using the capacitive touch control technology generally includes a touch panel disposed on a screen and configured for a user to approach or touch by an object such as a finger or a stylus. When the object approaches or touches the touch panel, a change of physical quantity occurs on the touch panel, for example, the change of the capacitance value, can be used to detect a position of the object approaching or touching the touch panel. In response to the touch, an icon shown on the screen corresponding to the detected position can be selected to generate and provide an input signal to a host to perform corresponding operation function. Therefore, the operation of touching the touch panel can replace the input operation of pressing the conventional traditional keyboard, so that the user can operate the touch panel in a more intuitive and easy way.

In order to enhance the confidentiality of protecting user data, the electronic devices using the touch-sensitive system in the market is to authenticate an identity of the user in cooperation with a specific authentication scheme. The most common manner is to ask the user to enter a correct password, and if the inputted password is correct, the user is allowed to perform further operational function. However, in the authentication mechanism using password, the user must input the characters of the password one by one, and it is inconvenient for user in operations. Furthermore, if the user forgets the password because of poor memory or too many passwords, the user may cause successive password input errors, which cause the host to lock or show an account disabled message, and the error problem bothers the user. Furthermore, the password may also be cracked or embezzled by person with bad intention. Therefore, there is room for improvement in security of the authentication mechanism using password, and the conventional authentication mechanism is also difficult to achieve advantages of the touch-sensitive system effects in the practical application. What is needed is to develop a touch control human-machine interface device to solve above-mentioned problem.

SUMMARY OF THE INVENTION

In order to solve the above-mentioned problems and deficiencies, the inventor develops a touch control man-machine interface device and an operation method thereof, according to collected data, years of experience, and multiple tests and modifications.

An objective of the present invention is to provide a touch recognition device which can be applied to a capacitive touch panel and a control unit of a touch control system, and when a user contacts an upper electrode of the touch recognition device by hand, the touch recognition device is pressed down on the capacitive touch panel, and the upper electrode is electrically connected to lower electrodes through a plurality of conductive lines, so that the lower electrodes can contact an upper surface of the capacitive touch panel, and the control unit can detect a change in amount of capacitive coupling generated between the capacitive touch panel and the lower electrodes, to calculate and recognize positions of the plurality of lower electrodes. The positions of three lower electrodes of the plurality of lower electrodes can be used to define an XY coordinate system and a coordinate of another lower electrode can be determined at the XY coordinate system. All or a part of the lower electrodes of the touch recognition device held by the user are disposed in different positions, so the coordinate(s) of another lower electrode of other lower electrodes can be used to define the identity of the user operating the touch recognition device, so as to increase complexity of cracking the touch recognition device, and further improve the safety in using the touch recognition device.

Another objective of the present invention is to provide a touch recognition device including an insulative carrier having a substrate, and an insulative protective layer disposed on upper and lower sides of the substrate and covered on surfaces of the upper electrode and the lower electrodes. The insulative protective layer is configured to prevent the upper electrode and the lower electrodes from being exposed, so as to protect the upper electrode and the lower electrodes from abrasion, contamination or cracks, thereby ensuring the detection accuracy of the touch recognition device. Furthermore, when the user's finger presses the insulative protective layer on the upper surface of the insulative carrier, capacitive coupling can be formed between the finger and the upper electrode, so that the control unit can detect the change in amount of capacitive coupling between the capacitive touch panel and the touch recognition device, and further calculate and recognize the positions of the plurality of lower electrodes and further recognize the identity of the user operating the touch recognition device.

Another objective of the present invention is that the touch recognition device further includes a reciprocating electrode, and the insulative carrier is provided with a through hole formed on the surface thereof. The reciprocating electrode comprises a body inserted into the through hole, and an elastic component located between the through hole and the body, and the reciprocating electrode is longitudinally movably disposed in the through hole. When the user presses and contacts the upper electrode of the touch recognition device and the reciprocating electrode by two fingers, the touch recognition device can be pressed down to move the lower electrodes and the reciprocating electrode to contact the upper surface of the capacitive touch panel, so that the control unit can detect the capacitive touch panel to calculate and recognize the positions of the lower electrodes and the reciprocating electrode. As a result, the reciprocating electrode can be served as a trigger switch mechanism, and the positions of the three lower electrodes can be used to define the XY coordinate system. The coordinate of the reciprocating electrode at the XY coordinate system can be used to define the identity of the user operating the touch recognition device. As a result, the touch recognition device of the present invention is hard to copy.

BRIEF DESCRIPTION OF THE DRAWINGS

The structure, operating principle and effects of the present disclosure will be described in detail by way of various embodiments which are illustrated in the accompanying drawings.

FIG. 11 is a flowchart showing the steps of an operation method of the touch recognition device of the fourth embodiment of the present invention.

DETAILED DESCRIPTION OF THE PREFERRED EMBODIMENTS

Figure 1:
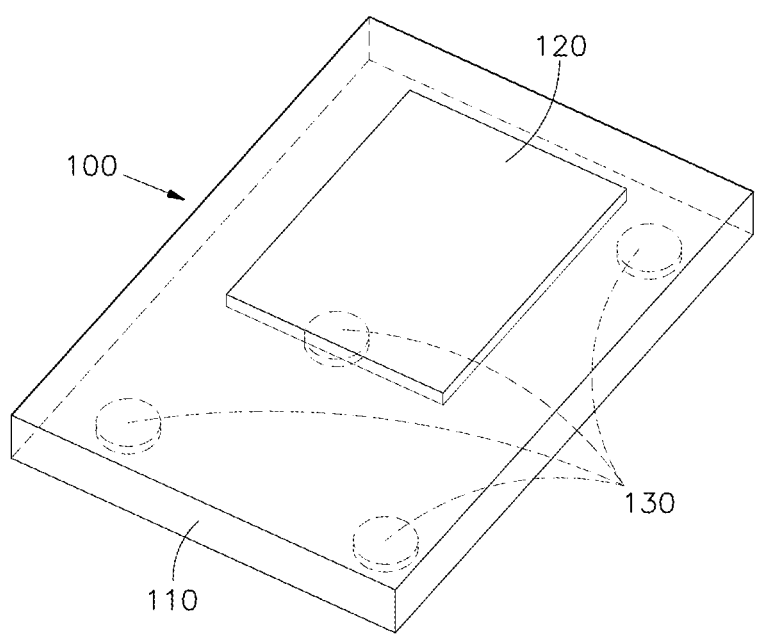
FIG. 1 is an elevational view of a touch recognition device of a first embodiment of the present invention.
Figure 2:
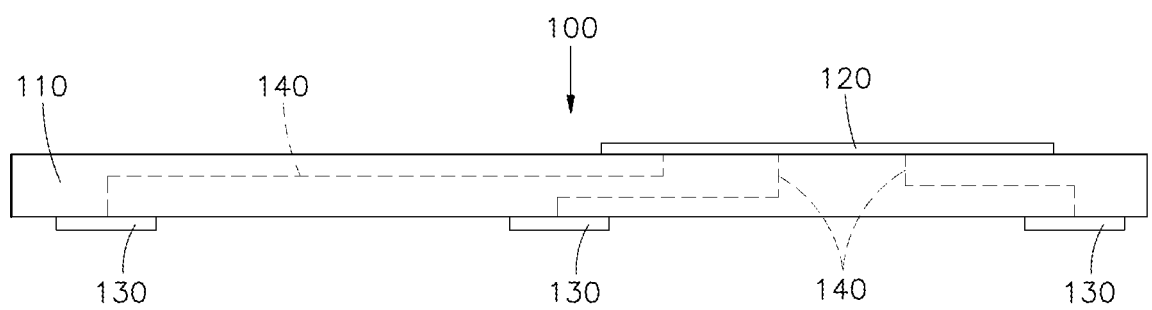
FIG. 2 is a side view of a touch recognition device of a first embodiment of the present invention.
Figure 3:
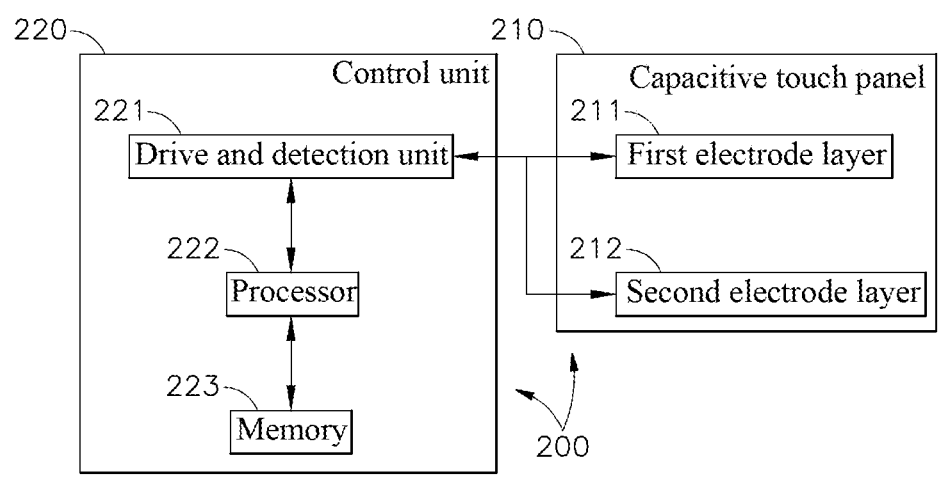
FIG. 3 is a block diagram of a touch control system of a first embodiment of the present invention.
Figure 4:
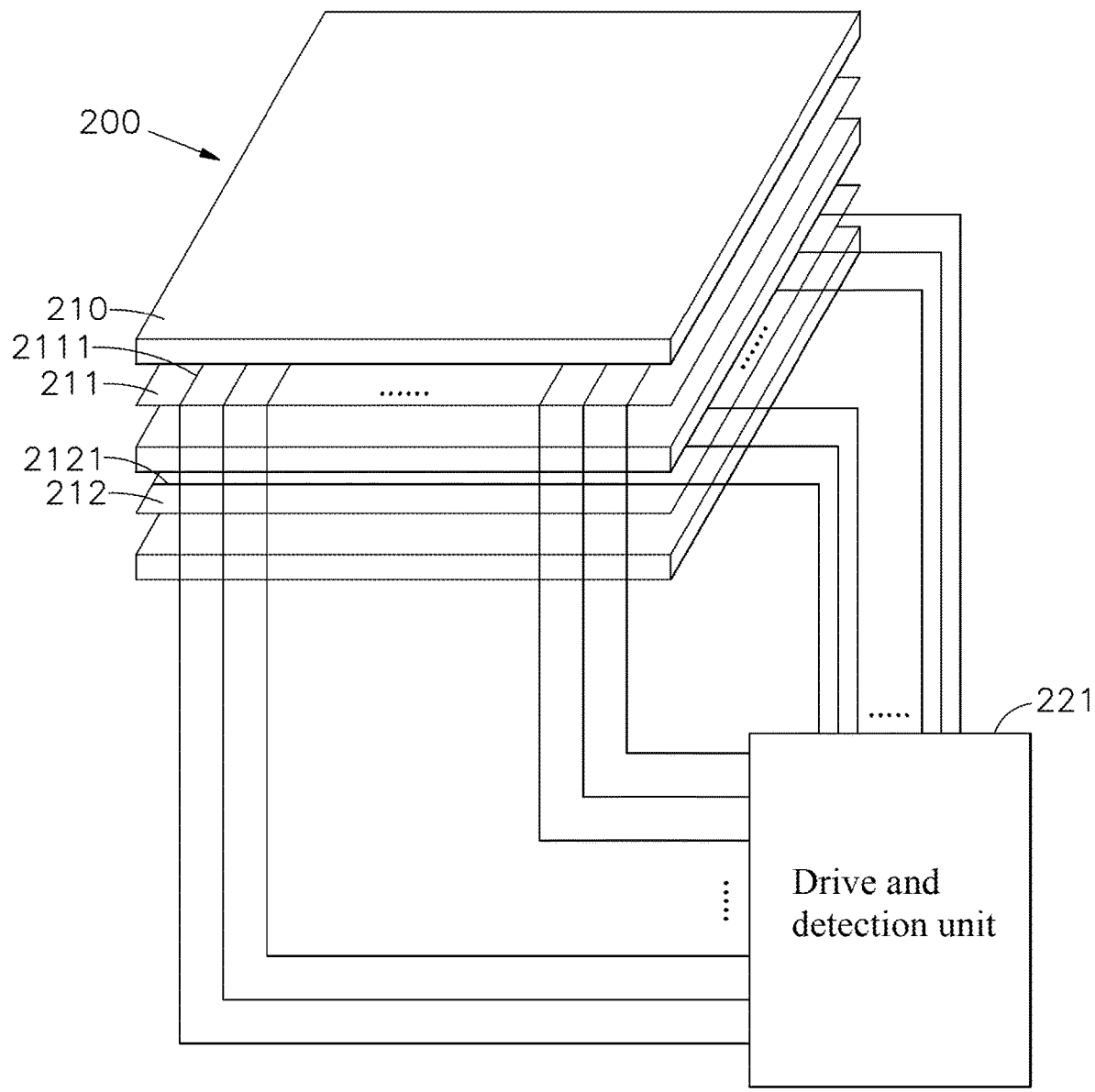
FIG. 4 is a schematic view of an architecture of a touch control system of a first embodiment of the present invention.
Figure 5:
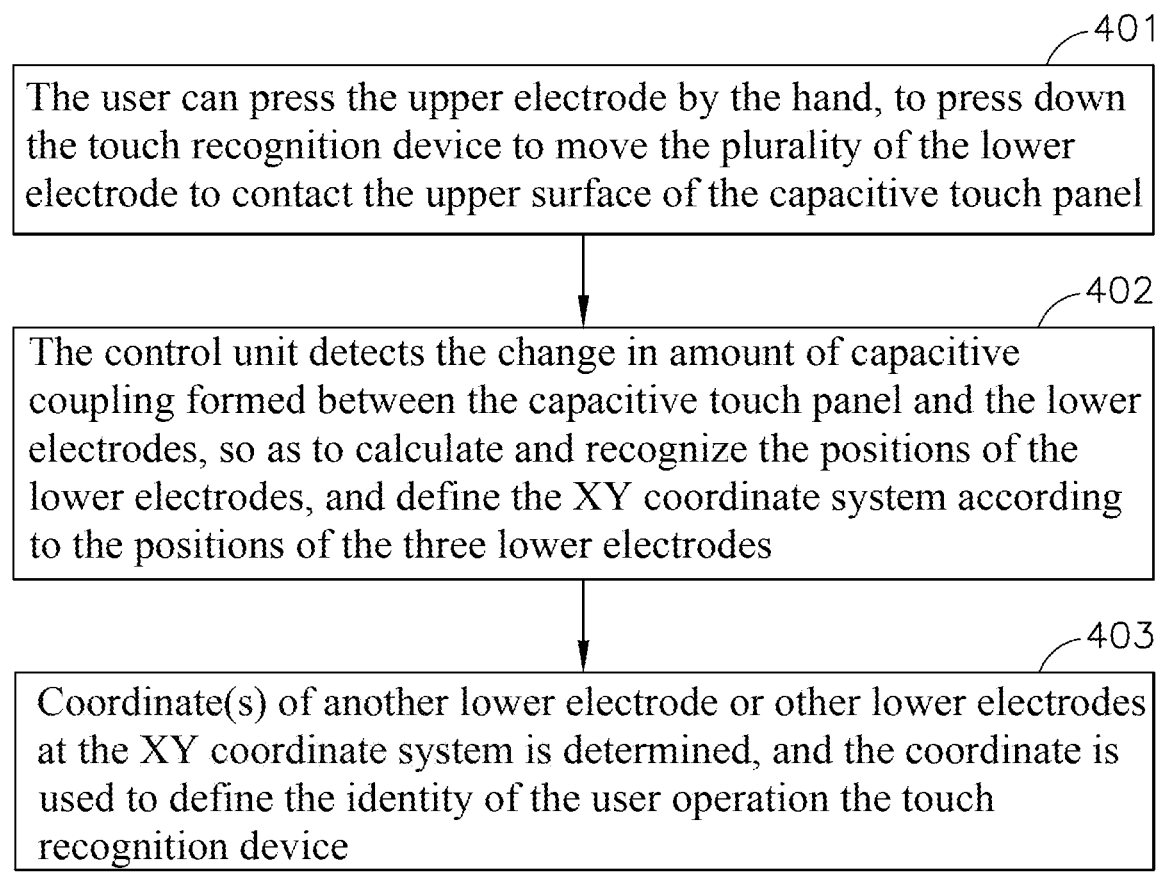
FIG. 5 is a flowchart showing the steps of an operation method of the touch recognition device of the first embodiment of the present invention.

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

Please refer to FIGS. 1 to 4, which show elevational view, side view of a touch recognition device of a first embodiment of the present invention, and block diagram and structural view of a touch control system of the present invention. As shown in FIG. 1, the touch control human-machine interface device includes a touch recognition device 100 and a touch control system 200. The operation method can be applied to the touch recognition device 100 and the touch control system 200 of the touch control man-machine interface device.

The touch recognition device 100 includes an insulative carrier 110 made of a non-conductive material, and an upper electrode 120 disposed on an upper surface of the insulative carrier 110, and at least four lower electrodes 130 disposed on a lower surface of the insulative carrier 110, and a plurality of conductive lines 140 configured to electrically connect the upper electrode 120 to the at least four lower electrodes 130. In this embodiment, the upper electrode 120 is in a rectangular shape, and each of the lower electrodes 130 is in a dot shape; however, practical application of the present invention is not limited thereto. Each of the electrodes can be in an oval shape, a parallelogram shape, or other geometric shape according to the structural design. The plurality of conductive lines 140 may be bent downwardly from the upper electrode 120 to extend through the insulative carrier 110, so as to electrically connect to the lower electrodes 130, respectively. In other embodiment, the conductive lines 140 may be bent to extend from the upper electrode 120 along an outer surface of the insulative carrier 110, for example the upper surface, the side surfaces and the lower surface, so as to electrically connect to the lower electrodes 130, respectively.

The touch control system 200 includes a capacitive touch panel 210 and a control unit 220. The capacitive touch panel 210 includes a first electrode layer 211 and a second electrode layer 212. The first electrode layer 211 includes a plurality of driving lines 2111 formed thereon and arranged in parallel with each other along a first direction (for example, a longitudinal direction). The second electrode layer 212 includes a plurality of sensing lines 2121 formed thereon and arranged in parallel with each other in a second direction (for example, a horizontal direction) and crossing the driving lines 2111, respectively, so that a plurality of sensing points can be formed at the intersections between the driving lines 2111 and the sensing lines 2121, respectively. The control unit 220 includes a drive and detection unit 221 and a processor 222. The drive and detection unit 221 is electrically connected to the first electrode layer 211 and the second electrode layer 212, to operatively couple the capacitive touch panel 210. The processor 222 is electrically connected to the drive and detection unit 221, and configured to control the drive and detection unit 221 to transmit driving signals to the first electrode layer 211 and receive sensing signals from the second electrode layer 212, so that an amount of capacitive coupling on the sensing points can be detected to generate sensing information.

In this embodiment, the processor 222 of the control unit 220 may also be electrically connected to a memory 223, so that the sensing information can be stored in the memory 223 for the processor 222 to access the sensing information. It should be noted that the above content relates to the application of the touch control system 200 and how the control unit 220 detects the touch position of the external object according to the sensing information generated by the capacitive touch panel 210, and are well known for the persons skilled in the art, and the detail of this content is not a key feature of the present invention, so this content will be described in the following content.

Please refer to FIGS. 5 to 9, which are flowchart showing the steps of operation method of the touch recognition device of the first embodiment of the present invention, side view of operation of the first embodiment of the present invention, schematic view of the recognition of the coordinate positions of the lower electrodes, side view of a touch recognition device of a second embodiment, and schematic view of recognition of the coordinate positions of the lower electrodes of the third embodiment. As shown in figures, the touch control human-machine interface device of the present invention is applicable to an access control automation architecture, and an automatic identification system can process the user's characteristic information. For example, the touch control system 200 can detect touch recognition information, digital card information or biological information provided by the touch recognition device 100, so as to determine the user's identity. When the user is determined to be allowed to enter, a loop circuit is activated to drive an electronic door lock to open; otherwise, the loop circuit does not do anything when the user is determined to be not allowed, or an alarm scheme can be activated or the electronic door lock can be locked for a period after several times of failure identifications. However, the actual application of the present invention is not limited to these examples. The access control system may also be integrated with the monitoring system, or the access control system or the touch control human-machine interface device may further be used for attendance and salary system, stored value and money system, and information record system or other systems or functions. As a result, the touch control human-machine interface device of the present invention can have improved practicability.

Furthermore, in a case that the operation method of the touch control human-machine interface device of the present invention is applied to the touch recognition device 100 and the touch control system 200, and the operation method can include steps 401 to 403.

In the step 401, the user can press the upper electrode 120 by a hand 300, to press down the touch recognition device 100 to move the lower electrodes 130 to contact the upper surface of the capacitive touch panel 210.

In the step 402, the control unit 220 detects the change in amount of capacitive coupling formed between the capacitive touch panel 210 and the lower electrodes 130, so as to calculate and recognize the positions of the lower electrodes 130, and define the XY coordinate system according to the positions of the three lower electrodes 130.

In the step 403, coordinate(s) of another lower electrode or other lower electrodes at the XY coordinate system is determined, and the coordinate is used to define the identity of the user operation the touch recognition device.

According to implementation of above steps, after the user places the touch recognition device 100 on the upper surface of the touch control system 200, and then place finger or palm of hand 300, or other conductive part of body (the hereinafter referred to as the finger) on the upper electrode 120, the touch recognition device 100 can be pressed down against the capacitive touch panel 210 without movement, and the lower electrodes 130 are in contact with the upper surface of the capacitive touch panel 210. The finger contacting the upper electrode 120 can be electrically connected to the lower electrodes 130 through the conductive lines 140, so the change of the amount of capacitive coupling can be formed by the electric loop formed between the capacitive touch panel 210 and the lower electrodes 130 through the human body. The control unit 220 can detect an induced current formed in the capacitive touch panel 210, to calculate the positions of the lower electrodes 130. After the control unit 220 defines the XY coordinate system according to the positions of the three lower electrodes 130 and determines the coordinate of the other lower electrode 130 at the XY coordinate system, the touch recognition information associated with the coordinate of the other lower electrode can be used to define the identity of the user operating the touch recognition device 100.

Figure 6:
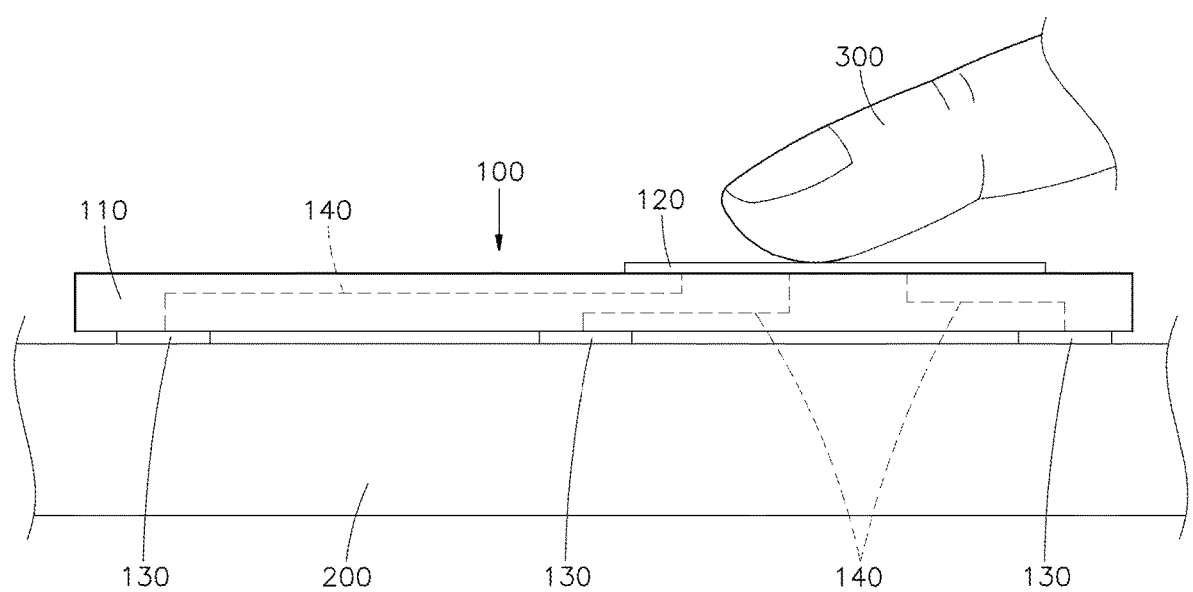
FIG. 6 is a side view showing operation of the touch recognition device of the first embodiment of the present invention.
Figure 7:
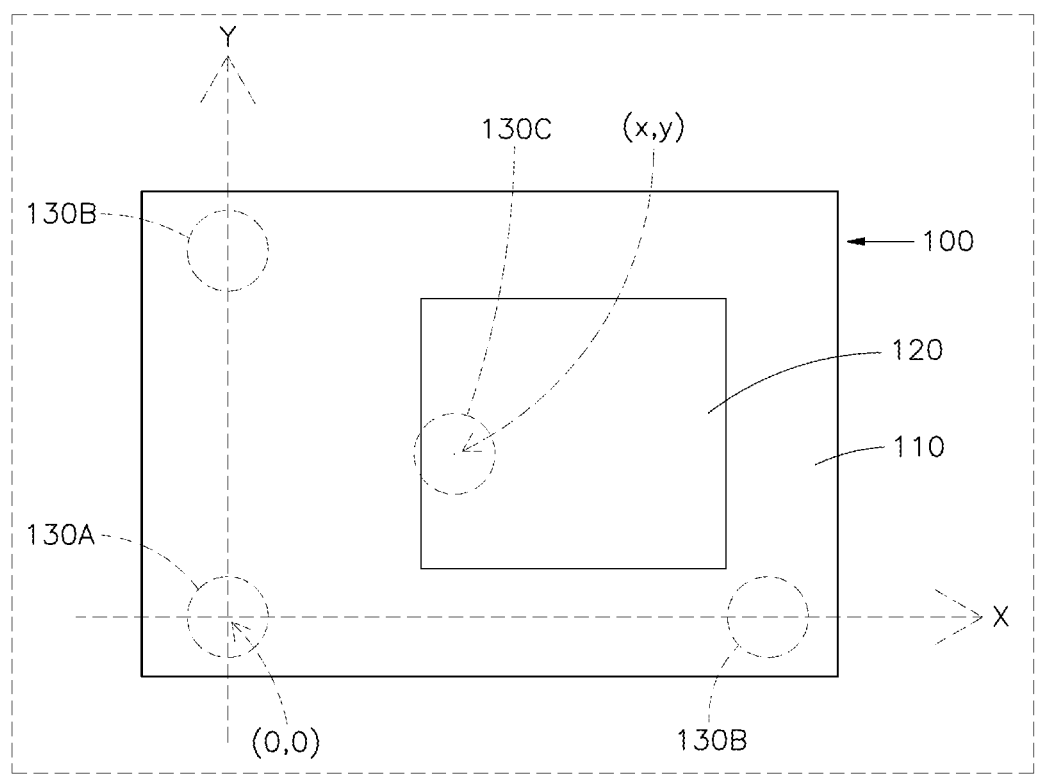
FIG. 7 is a schematic view of the touch recognition device recognizing the coordinate position of the lower electrode, in accordance with the first embodiment of the present invention.

As shown in FIGS. 6 and 7, the touch control system 200 of this embodiment can recognize the positions of the four lower electrodes 130 of the touch recognition device 100 contacting the upper surface of the capacitive touch panel 210. Among the four lower electrodes 130, the positions of three assigned lower electrodes 130A and 130B can be used to define a XY coordinate system. In more detail, the position of the first lower electrode 130A is served as an original point of the XY coordinate system, a line connecting between the first lower electrode 130A and the second lower electrode 130B (for example, the point on a positive X-axis) can be perpendicular to a line connecting between the positions of the first lower electrode 130A and the third lower electrode 130B (for example, the point on a positive X-axis), and the fourth lower electrode 130C is a point with coordinate position to be measured. The control unit 220 can calculate the position of the fourth lower electrode 130C relative to the original point of the XY coordinate system, so as to determine the coordinate (x, y) of the fourth lower electrode 130C at the XY coordinate system. Since all or a part of the lower electrodes 130C of the touch recognition device 100 are disposed at different positions, the identity of the user operating the touch recognition device 100 can be defined by the coordinate (x, y).

Figure 8:
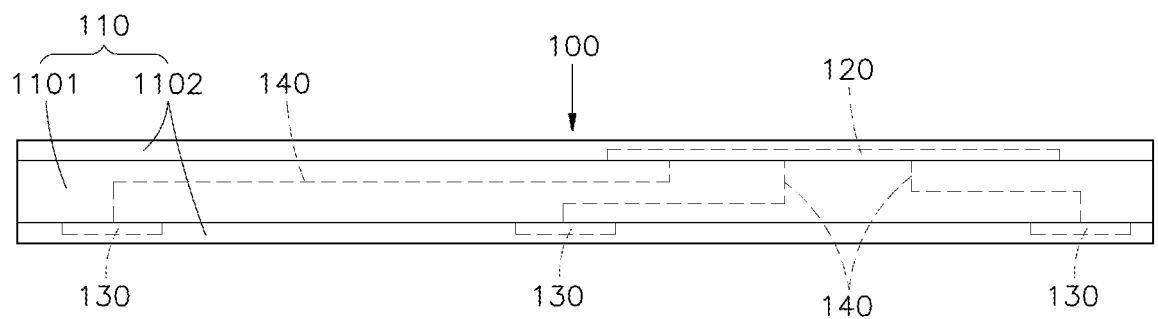
FIG. 8 is a side view of a touch recognition device of a second embodiment of the present invention.

As shown in FIG. 8, the insulative carrier 110 of the touch recognition device 100 includes a substrate 1101 and an insulative protective layer 1102. The insulative protective layer 1102 is disposed on upper and lower sides of the substrate 1101 to cover the surfaces of the upper electrode 120 and the lower electrodes 130. The insulative protective layer 1102 is configured to protect the upper electrode 120 and the lower electrodes 130 from be exposed out of the insulative carrier 110 to cause abrasion, contamination or cracks which may reduce the conductivity of the electrodes and affect the accuracy of position detection. Furthermore, when the finger presses on the insulative protective layer 1102 on the upper surface of the insulative carrier 110, a capacitive coupling can be formed between the finger and the upper electrode 120, and the control unit 220 can detect the change in the amount of capacitive coupling formed between the capacitive touch panel 210 and the touch recognition device 100, so as to calculate the positions of the lower electrodes 130, and further recognize the identity of the user operating the touch recognition device 100.

Figure 9:
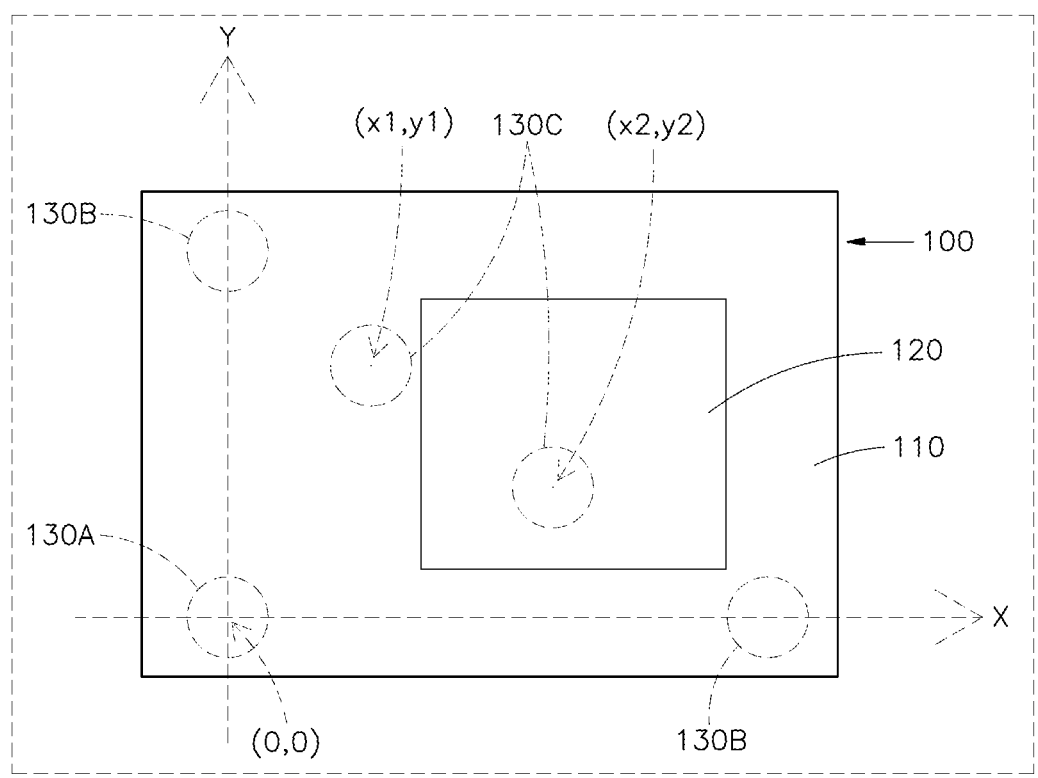
FIG. 9 is a schematic view of a touch recognition device recognizing a coordinate position of a lower electrode, in accordance with a third embodiment of the present invention.
Figure 10:
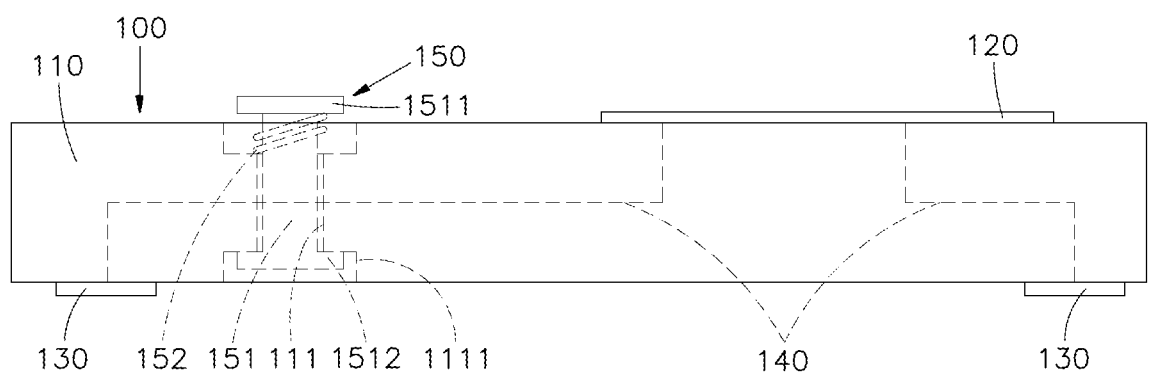
FIG. 10 is a side view of a touch recognition device of a fourth embodiment of the present invention.
Figure 12:
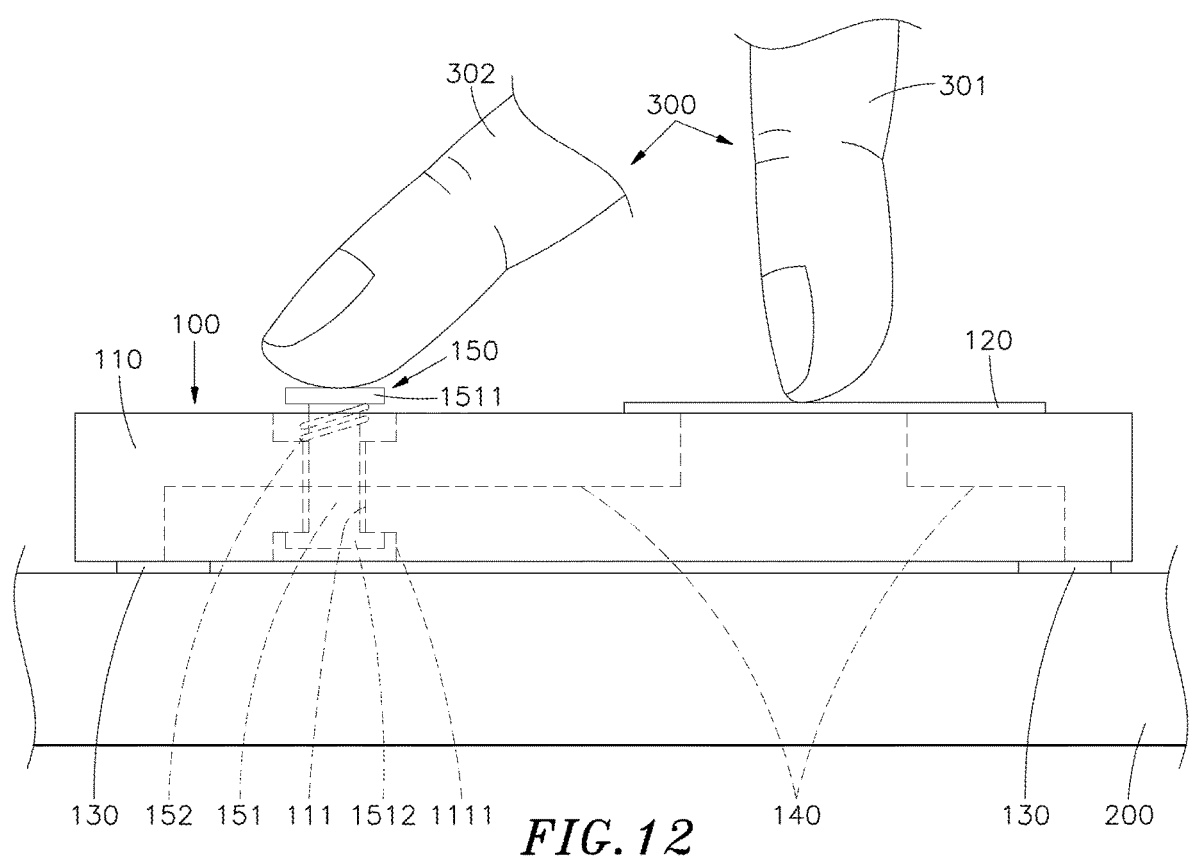
FIG. 12 is a side view of the touch recognition device of the fourth embodiment of the present invention, during operation.
Figure 13:
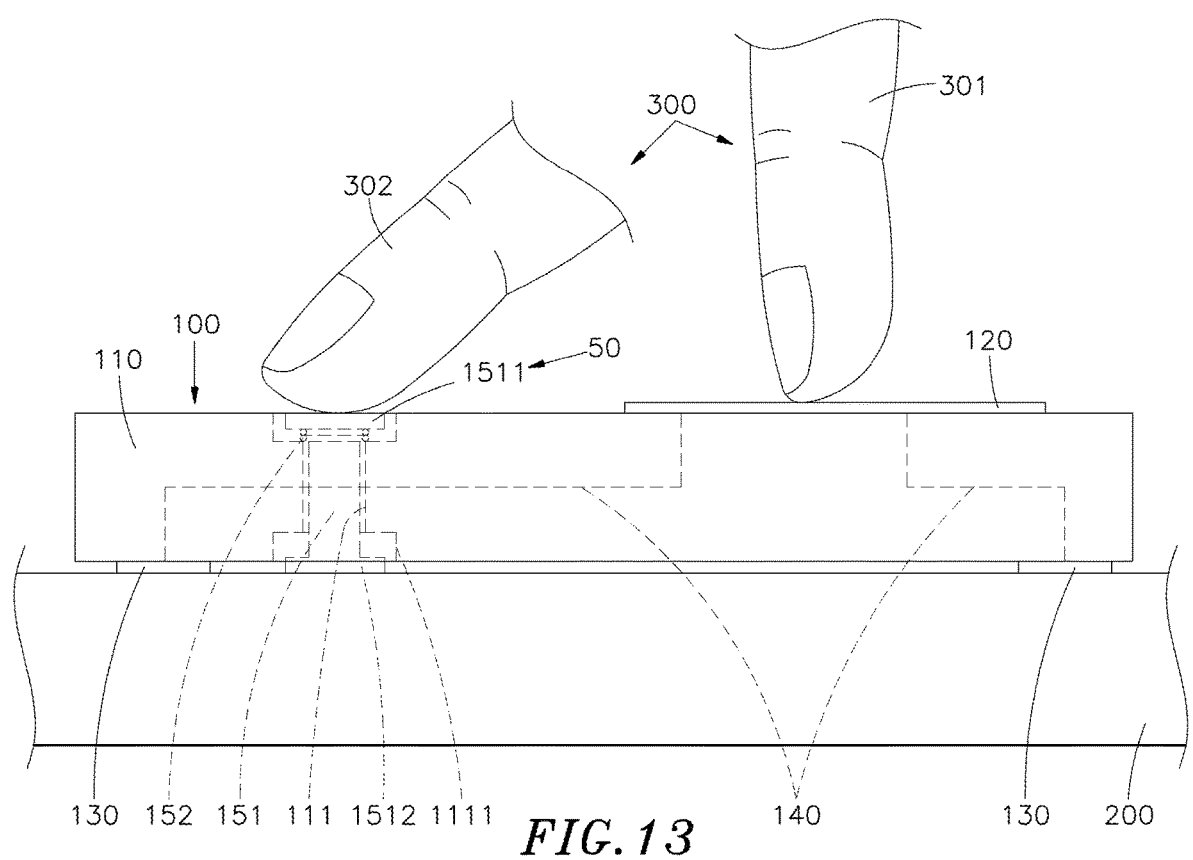
FIG. 13 is a side view of the touch recognition device of the fourth embodiment of the present invention, after the touch recognition device is operated.
Figure 14:
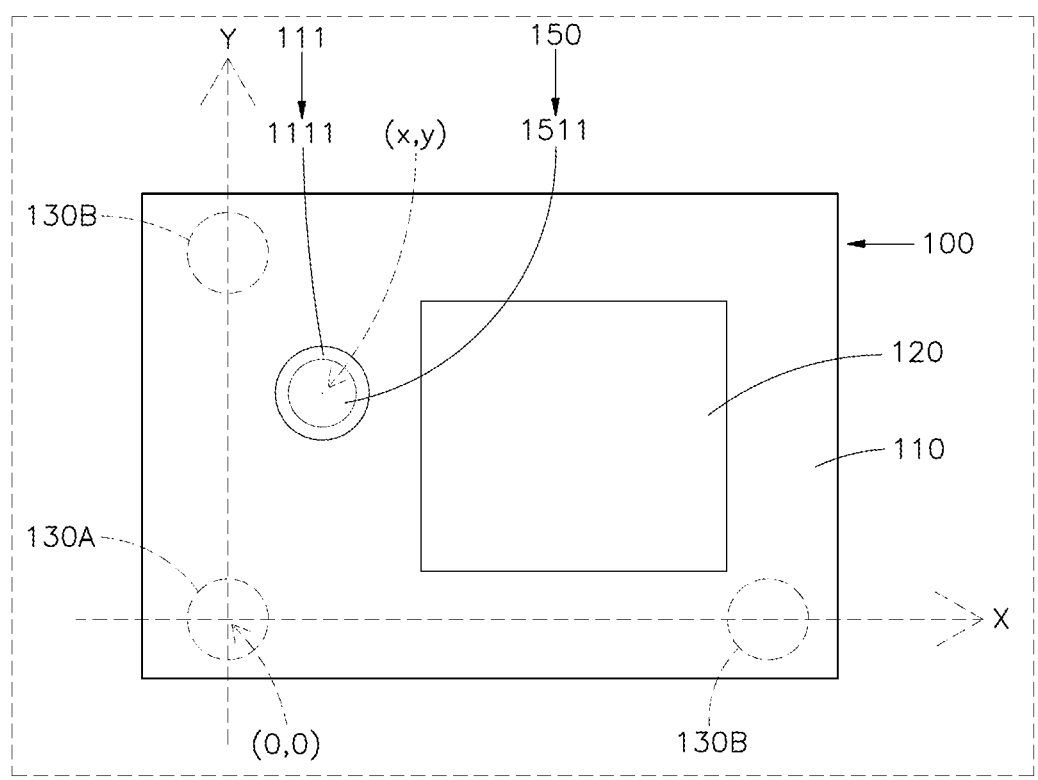
FIG. 14 is a schematic view of the touch recognition device recognizing a coordinate position of a reciprocating electrode, in accordance with the fourth embodiment of the present invention.

As shown in FIG. 9, the position and number of the lower electrode 130C of the touch recognition device 100 of this embodiment is different from that of the first embodiment; however, this embodiment is merely for exemplary illustration, and the present invention is not limited thereto. The touch recognition device 100 may include at least two lower electrodes 130C as the points with coordinate positions to be measured. For example, when a number of the lower electrodes 130C is two, the touch control system 200 can recognize coordinates (x1, y1) and (x2, y2) of the fourth and fifth lower electrodes 130C at the XY coordinate system, and the identity of the user operating the touch recognition device 100 can be defined by the two coordinates (x1, y1) and (x2, y2) both, so that the touch recognition device of this embodiment can have higher complexity of being cracked and improved safety in use.

Please refer to FIGS. 10 through 14, which show side view of a touch recognition device of a fourth embodiment of the present invention, flowchart showing the steps of an operation method of the touch recognition device of the fourth embodiment of the present invention, side view during operation and after operation, and schematic view showing recognition of the coordinate of the reciprocating electrode. As shown in figures, besides the insulative carrier 110, the upper electrode 120 on the upper surface of the insulative carrier 110 and at least three lower electrodes 130 formed on the lower surface of the insulative carrier 110 and the plurality of conductive lines 140 for electrically connection between the upper electrode 120 and the lower electrodes 130, the touch recognition device 100 of this embodiment further comprises a reciprocating electrode 150. The insulative carrier 110 is provided with a through hole 111 formed on a surface thereof, and accommodating grooves 1111 formed at upper and lower openings of the through hole 111, respectively. Each of the accommodating grooves 1111 has an aperture larger than the aperture of the through hole 111. The reciprocating electrode 150 comprises a body 151 made of conductive material and inserted into the through hole 111, and an elastic component 152 disposed and elastically deformed between the through hole 111 and the body 151. The body 151 includes a press part 1511 and a contact part 1512 respectively formed at upper and lower sides thereof. Each of the press part 1511 and the contact part 1512 has a lager outer diameter and can be extended of or located within one of the accommodating grooves 1111. The elastic component 152 is mounted on the body 151 and includes an end abutted with a bottom of the accommodating groove 1111 above the through hole 111, and other end elastically stopped against a bottom of the press part 1511. When the press part 1511 of the body 151 is pressed by the user's hand, the elastic component 152 is pressed down to force the reciprocating electrode 150 to move longitudinally along the through hole 111.

In a case that the operation method of the touch control human-machine interface device of this embodiment of the present invention is applied to the touch recognition device 100 and the touch control system 200, the operation method includes steps 501 to 503.

In the step 501, the user presses the upper electrode 120 and the reciprocating electrode 150 by the hand 300, to press down the touch recognition device 100 to move the lower electrodes 130 and the reciprocating electrode 150 to contact the upper surface of the capacitive touch panel 210.

In the step 502, the control unit 220 detects the change in amount of capacitive coupling formed between the capacitive touch panel 210, and the lower electrodes 130 and the reciprocating electrode 150, so as to recognize the positions of the lower electrodes 130 and the reciprocating electrode 150 and then define a XY coordinate system according to positions of the three lower electrodes 130.

In the step 503, the coordinate of the reciprocating electrode 150 at the XY coordinate system is determined, and the determined coordinate is used to define the identity of the user operating the touch recognition device.

According to implementation of the steps, after the user touches the upper electrode 120 of the touch recognition device 100, and the surface of the body 151 of the reciprocating electrode 150 by a first finger 301 and a second finger 302 or palm, the press part 1511 can be pressed down to elastically deform the elastic component 152, so as to move the contact part 1512 to contact the upper surface of the capacitive touch panel 210. When a first finger 301 contacts the upper electrode 120 or the capacitive coupling is formed between the insulative protective layer 1102 of the substrate 1101 (as shown in FIG. 8) and the upper electrode 120, the upper electrode 120 can be electrically connected to the lower electrodes 130 via the plurality of the conductive lines 140, and after a second finger 302 contacts and presses the body 151 of the reciprocating electrode 150, the contact part 1512 is moved to contact the upper surface of the capacitive touch panel 210, the control unit 220 can calculate and recognize the positions of the three lower electrodes 130 and the reciprocating electrode 150 by detecting the capacitive touch panel 210. The reciprocating electrode 150 can be used as a trigger switch mechanism to prevent malfunction.

In an embodiment, the touch recognition device 100 can include the three lower electrodes 130A and 130B for defining the XY coordinate system, and the at least one lower electrode 130C as the point with coordinate position to be measured, and the touch recognition device 100 can determine the coordinate (x, y) of the reciprocating electrode 150 and all or part of other lower electrodes 130C, which are other than the lower electrodes forming the XY coordinate system, located in different positions at the XY coordinate system. The touch recognition device 100 can define the user's identity based on the coordinates (x, y). As a result, the touch recognition device 100 is hard to be copied.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A touch control man-machine interface device, applied to a capacitive touch panel and a control unit of a touch control system, wherein the control unit is electrically connected to the capacitive touch panel, and the touch control man-machine interface device comprises:
   a touch recognition device configured to be placed on an upper surface of the capacitive touch panel, and comprising:
      an insulative carrier;
      an upper electrode disposed on an upper surface of the insulative carrier and configured to be contacted by a hand;
      at least four lower electrodes disposed on a lower surface of the insulative carrier and configured to contact the upper surface of the capacitive touch panel; and
      a plurality of conductive lines configured to electrically connect the upper electrode to the at least four lower electrodes;
      wherein the control unit is configured to detect the capacitive touch panel to recognize positions of the at least four lower electrodes, and define an XY coordinate system based on the positions of the three lower electrodes of the at least four lower electrodes, and determine a coordinate of another lower electrode among the at least four lower electrodes at the XY coordinate system, and use the determined coordinate to define an identity of a user operating the touch recognition device.

2. The touch control man-machine interface device according to claim 1, wherein the insulative carrier comprises a substrate, and an insulative protective layer disposed on upper and lower sides of the substrate and configured to cover surfaces of the upper electrode and the at least four lower electrodes.

3. The touch control man-machine interface device according to claim 1, wherein among the at least four lower electrodes of the touch recognition device, a position of a first lower electrode is served as an original point of the XY coordinate system, a line connecting between positions of the first lower electrode and a second lower electrode on a positive X axis is perpendicular to a line connecting between positions of the first lower electrode and a third lower electrode on a positive Y axis, and another lower electrode disposed at different position is served as points with coordinate position to be measured, and the control unit calculates the coordinate positions relative to the original point of the XY coordinate system.

4. The touch control man-machine interface device according to claim 3, wherein the touch recognition device comprises the three lower electrodes for defining the XY coordinate system, and at least two other lower electrodes served as the points with coordinate positions to be measured.

5. An operation method of a touch control man-machine interface device, applied to a touch recognition device of the touch control man-machine interface device and a touch control system, wherein the touch control system comprises a capacitive touch panel and a control unit electrically connected to the capacitive touch panel, and the touch recognition device comprises an insulative carrier, an upper electrode disposed on an upper surface of the insulative carrier, and at least four lower electrodes disposed on a lower surface of the insulative carrier, and a plurality of conductive lines configured to electrically connect the upper electrode to the at least four lower electrodes, and the operation method comprises:
   pressing, by a user, the upper electrode to press down the touch recognition device, to move the at least four lower electrodes to contact an upper surface of the capacitive touch panel;
   detecting, by the control unit, a change in amount of capacitive coupling formed between the capacitive touch panel and the at least four lower electrodes, to recognize positions of the at least four lower electrodes, and defining an XY coordinate system according to the positions of the three lower electrodes among the at least four lower electrodes; and
   determining a coordinate of at least one other lower electrode among the at least four lower electrodes, and using the coordinate to define an identity of the user operating the touch recognition device.

6. The operation method according to claim 5, wherein among the three lower electrodes for defining the XY coordinate system, the control unit uses the position of a first lower electrode of the three lower electrodes as an original point of the XY coordinate system, and a line connecting between the positions of the first lower electrode and a second lower electrode on a positive X axis is perpendicular to a line connecting between the first lower electrode and a third lower electrode on a positive Y axis, thereby defining the XY coordinate system;
   wherein at least one other lower electrode of the at least four lower electrodes disposed in different position is served a point with a coordinate position to be measured.

7. The operation method according to claim 5, wherein the touch recognition device comprises the three lower electrodes for defining the XY coordinate system, and at least two other lower electrodes served as the points with coordinate positions to be measured.

8. A touch control man-machine interface device, applied to a capacitive touch panel and a control unit of a touch control system, wherein the control unit is electrically connected to the capacitive touch panel, and the touch control man-machine interface device comprises a touch recognition device disposed on an upper surface of the capacitive touch panel, and the touch recognition device comprises:
   an insulative carrier;
   an upper electrode disposed on an upper surface of the insulative carrier;
   at least three lower electrode disposed on a lower surface of the insulative carrier; and
   a plurality of conductive lines configured to electrically connect the upper electrode to the plurality of lower electrodes;
   wherein the insulative carrier is provided with a through hole, and the touch recognition device comprise a reciprocating electrode comprising a body inserted into the through hole, and an elastic component disposed between the through hole and the body and configured to make the reciprocating electrode longitudinally movable along the through hole;

wherein the control unit is configured to detect the capacitive touch panel to recognize positions of the at least three lower electrodes, and when the reciprocating electrode is pressed by a user to contact the upper surface of the capacitive touch panel, the control unit defines a XY coordinate system according to the positions of the at least three lower electrodes, and determine a coordinate of the reciprocating electrode at the XY coordinate system and use the determined coordinate to define an identity of the user operating the touch recognition device.

9. The touch control man-machine interface device according to claim 8, wherein the insulative carrier comprises a substrate, and an insulative protective layer disposed on upper and lower sides of the substrate and configured to cover surfaces of the upper electrode and the at least three lower electrodes.

10. The touch control man-machine interface device according to claim 8, wherein among the at least three lower electrodes of the touch recognition device, a position of a first lower electrode is served as an original point of the XY coordinate system, a line connecting between positions of the first lower electrode and a second lower electrode on a positive X axis is perpendicular to a line connecting between positions of the first lower electrode and a third lower electrode on a positive Y axis, and the reciprocating electrode is served as a point with a coordinate position to be measured, and the control unit calculates the coordinate position relative to the original point of the XY coordinate system.

11. The touch control man-machine interface device according to claim 10, wherein the touch recognition device comprises the at least three lower electrodes configured to define the XY coordinate system, and at least one other lower electrode as a point with a coordinate position to be measured.

12. An operation method of a touch control man-machine interface device, applied to a touch recognition device of a touch control man-machine interface device and a touch control system, wherein the touch control system comprises a capacitive touch panel and a control unit electrically connected to the capacitive touch panel, and the touch recognition device comprises an insulative carrier, an upper electrode disposed on an upper surface of the insulative carrier, and at least three lower electrodes disposed on a lower surface of the insulative carrier, and a plurality of conductive lines configured to electrically connect the upper electrode to the at least three lower electrodes, and the insulative carrier is provided with a through hole, and the touch recognition device comprise a reciprocating electrode comprising a body inserted into the through hole, and an elastic component disposed between the through hole and the body and configured to make the reciprocating electrode longitudinally movable along the through hole, and the operation method comprises:

pressing, by a user, the upper electrode and the reciprocating electrode, to press down the touch recognition device, to move the at least three lower electrodes and the reciprocating electrode to contact an upper surface of the capacitive touch panel;

detecting, by the control unit, a change in amount of capacitive coupling formed between the capacitive touch panel, and the at least three lower electrodes and the reciprocating electrode, to recognize positions of the at least three lower electrodes and the reciprocating electrode, and define an XY coordinate system according to the positions of the at least three lower electrodes; and determining a coordinate of the reciprocating electrode, and using the coordinate to define an identity of the user operating the touch recognition device.

13. The operation method according to claim 12, wherein among the three lower electrodes, the control unit uses the position of a first lower electrode of the three lower electrodes as an original point of the XY coordinate system, and a line connecting between the positions of the first lower electrode and a second lower electrode on a positive X axis is perpendicular to a line connecting between the first lower electrode and a third lower electrode on a positive Y axis, thereby defining the XY coordinate system;

wherein the reciprocating electrode is served a point with a coordinate position to be measured.

14. The operation method according to claim 12, wherein the touch recognition device comprises three lower electrodes for defining the XY coordinate system, and at least one other lower electrode served as a point with a coordinate position to be measured.

\* \* \* \* \*